(12) United States Patent
Kuroda et al.

(10) Patent No.: US 11,034,177 B2
(45) Date of Patent: Jun. 15, 2021

(54) INK-JET RECORDING METHOD

(71) Applicant: KAO CORPORATION, Tokyo (JP)

(72) Inventors: Azusa Kuroda, Wakayama (JP); Yuta Matsumoto, Cincinnati, OH (US)

(73) Assignee: KAO CORPORATION, Tokyo (JP)

( * ) Notice: Subject to any disclaimer, the term of this patent is extended or adjusted under 35 U.S.C. 154(b) by 251 days.

(21) Appl. No.: 16/309,788

(22) PCT Filed: Jun. 16, 2017

(86) PCT No.: PCT/JP2017/022357
§ 371 (c)(1),
(2) Date: Dec. 13, 2018

(87) PCT Pub. No.: WO2017/217540
PCT Pub. Date: Dec. 21, 2017

(65) Prior Publication Data
US 2019/0126657 A1    May 2, 2019

(30) Foreign Application Priority Data

Jun. 17, 2016  (JP) .............................. JP2016-121268

(51) Int. Cl.
*B41M 5/00* (2006.01)
*C09D 11/30* (2014.01)
(Continued)

(52) U.S. Cl.
CPC ............ *B41M 5/0023* (2013.01); *B41M 5/00* (2013.01); *C09D 11/033* (2013.01); *C09D 11/30* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2004/0080574 A1* 4/2004 Masumi ................ B41J 2/1634
347/47
2007/0197685 A1    8/2007 Aruga et al.
(Continued)

FOREIGN PATENT DOCUMENTS

CN       102233719 A    11/2011
CN       104943377 A     9/2015
(Continued)

OTHER PUBLICATIONS

European Patent Office Communication and extended search report issued in the corresponding European Patent Application No. 17813433.4 dated Dec. 13, 2019.
(Continued)

*Primary Examiner* — Manish S Shah
(74) *Attorney, Agent, or Firm* — Birch, Stewart, Kolasch & Birch, LLP

(57) ABSTRACT

The present invention relates to an ink-jet printing method that is capable of obtaining good printed characters or images which are free of thermal deformation of a low-liquid absorbing printing medium as well as occurrence of mottling or color bleeding. The present invention provides an ink-jet printing method including the step of printing characters or images on a low-liquid absorbing printing medium using an ink-jet printing apparatus equipped with an ink-jet print head that is capable of ejecting water-based inks onto the low-liquid absorbing printing medium, in which the water-based inks each contain a colorant (A), an organic solvent (C) and water; the ink-jet printing apparatus is loaded with the two or more kinds of water-based inks which are different in static surface tension from each other; the printing medium is heated to a temperature of from 30 to 75° C.; and the water-based inks are ejected in the sequential
(Continued)

order from the water-based ink having a higher static surface tension.

21 Claims, 1 Drawing Sheet

(51) Int. Cl.
*C09D 11/033* (2014.01)
*C09D 11/322* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 2008/0152877 A1* | 6/2008 | Mukai | B41M 5/0023 428/195.1 |
| 2010/0295891 A1 | 11/2010 | Goto et al. | |
| 2011/0234682 A1 | 9/2011 | Ohta et al. | |
| 2011/0234728 A1 | 9/2011 | Aoki et al. | |
| 2012/0075381 A1 | 3/2012 | Wachi | |
| 2012/0176455 A1 | 7/2012 | Ohta et al. | |
| 2012/0262517 A1 | 10/2012 | Takaku et al. | |
| 2013/0083117 A1 | 4/2013 | Ohmoto | |
| 2013/0187998 A1 | 7/2013 | Ohmoto | |
| 2015/0275014 A1 | 10/2015 | Yamazaki et al. | |
| 2015/0337149 A1 | 11/2015 | Wakabayashi et al. | |
| 2017/0096570 A1* | 4/2017 | Litman | C09D 11/037 |

FOREIGN PATENT DOCUMENTS

| | | | | |
|---|---|---|---|---|
| JP | 2004-034441 A | | 2/2004 | |
| JP | 2004034441 A | * | 2/2004 | ............... B41J 2/01 |
| JP | 2007-125855 A | | 5/2007 | |
| JP | 2007-230021 A | | 9/2007 | |
| JP | 2007-331171 A | | 12/2007 | |
| JP | 2009-166387 A | | 7/2009 | |
| JP | 2010-064478 A | | 3/2010 | |
| JP | 2010064478 A | * | 3/2010 | ............... B41J 2/01 |
| JP | 2010-221670 A | | 10/2010 | |
| JP | 2011-194818 A | | 10/2011 | |
| JP | 2012-52042 A | | 3/2012 | |
| JP | 2012-72355 A | | 4/2012 | |
| JP | 2015-92317 A | | 5/2012 | |
| JP | 2012-224658 A | | 11/2012 | |
| JP | 2012-251047 A | | 12/2012 | |
| JP | 2013-82209 A | | 5/2013 | |
| JP | 2013-107224 A | | 6/2013 | |
| JP | 2013-166364 A | | 8/2013 | |
| JP | 2014-139004 A | | 7/2014 | |
| JP | 2015-151463 A | | 8/2015 | |

OTHER PUBLICATIONS

International Search Report (PCT/ISA/210) issued in PCT/JP2017/022357, dated Aug. 22, 2017.

* cited by examiner

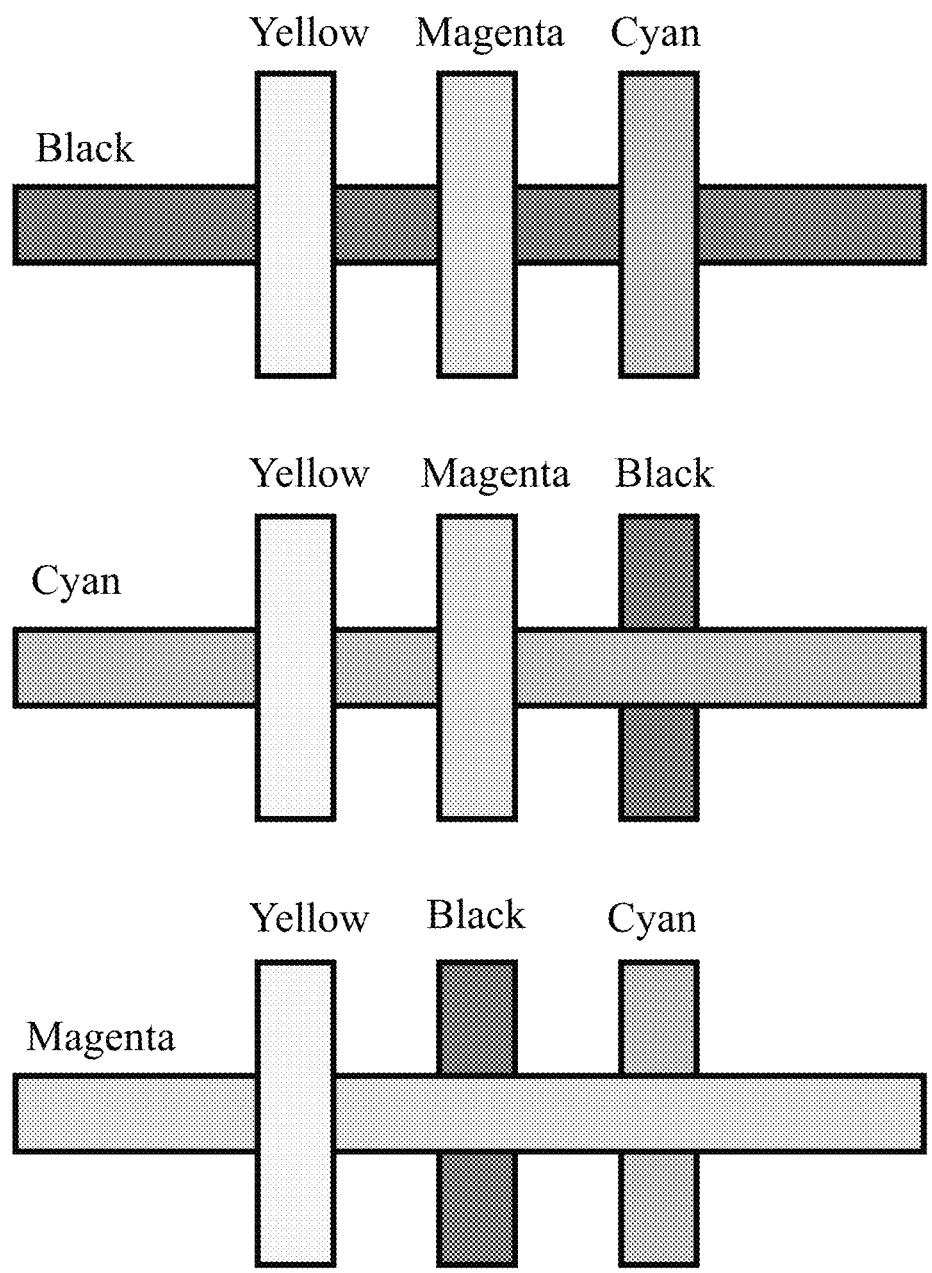

INK-JET RECORDING METHOD

FIELD OF THE INVENTION

The present invention relates to an ink-jet printing method.

BACKGROUND OF THE INVENTION

In ink-jet printing methods, droplets of ink are directly projected onto a printing medium from very fine nozzles and allowed to adhere to the printing medium to form characters or images thereon. The ink-jet printing methods have become rapidly spread because of various advantages such as easiness of full coloration, low cost, capability of using a plain paper as the printing medium, non-contact with printed characters or images, etc.

On the other hand, it has been required to print characters or images not only on a high-liquid absorbing printing medium such as those printing media conventionally called a plain paper or a copying paper, etc., but also on a printing medium for commercial printing purposes such as a low-liquid absorbing coated paper such as an offset coated paper or a non-liquid absorbing resin film such as a polyvinyl chloride resin film, a polypropylene resin film and a polyester resin film.

It is known that when characters or images are printed on the low-liquid absorbing or non-liquid absorbing printing medium by the ink-jet printing methods, there tend to occur problems such as prolonged drying time of ink owing to slow absorption or no absorption of liquid components of the ink, and deterioration in rub fastness of the printed characters or images in an initial stage of the printing.

Hitherto, when printing characters or images on the low-liquid absorbing or non-liquid absorbing printing medium, a solvent-based pigment ink using an organic solvent as a dispersing medium and a UV-curing ink have been mainly employed. This is because by using such a phenomenon that the organic solvent is penetrated into the low-liquid absorbing or non-liquid absorbing printing medium and causes swelling of the surface of the printing medium to thereby fix the pigment in the printing medium, or by forming a firm resin coating on the printing medium after printing, it is possible to improve anti-bleeding properties and rub fastness of these inks.

However, these conventional inks tend to have such a problem that a large amount of the organic solvent is diffused into air upon drying the ink to cause adverse influence on environments, or a radical initiator or a monomer used in the UV-curing ink poses a risk concerning safety. For this reason, at the present time, development of a water-based ink having a less burden on working environments and natural environments has proceeded.

On the other hand, almost all of conventional water-based inks have such a problem that they are incapable of forming good printed characters or images on a low-liquid absorbing or non-liquid absorbing printing medium.

JP 2007-331171A (Patent Literature 1) discloses an image-forming method in which dots of inks are stabilized in shape to form good characters or images, which includes the step of first applying a reaction solution containing a component that is reactive with inks onto a printing medium and then applying the plural kinds of inks onto the printing medium in the sequential order from the ink having a higher surface tension to form the printed characters or images thereon.

JP 2012-224658A (Patent Literature 2) discloses an ink-jet printing method using a water-based ink as a method of forming good characters or images which are free of mottling (uneven density of ink) or occurrence of white spots on a non-absorbing printing medium, in which an evaporation rate and a surface tension of ink fall within respective specific ranges; the ink contains two or more kinds of organic solvents; the ink has such a solubility parameter that a sum of a hydrogen bonding term and a polarity term falls within a specific range; and a content of a surfactant in the ink is less than a critical micelle concentration of the surfactant.

SUMMARY OF THE INVENTION

The present invention relates to an ink-jet printing method including the step of printing characters or images on a low-liquid absorbing printing medium using an ink-jet printing apparatus equipped with an ink-jet print head that is capable of ejecting water-based inks onto the low-liquid absorbing printing medium, in which:

the water-based inks each contain a colorant (A), an organic solvent (C) and water;

the ink-jet printing apparatus is loaded with the two or more kinds of water-based inks which are different in static surface tension from each other;

the printing medium is heated to a temperature of from 30 to 75° C.;

and the water-based inks are ejected in the sequential order from the water-based ink having a higher static surface tension.

BRIEF DESCRIPTION OF THE DRAWING

FIG. 1 is a view showing a print pattern used for evaluating printed materials obtained in respective Examples, etc.

DETAILED DESCRIPTION OF THE INVENTION

In the Patent Literature 1, there is described the technology in which by applying the inks onto the printing medium in the sequential order from the ink having a higher surface tension, occurrence of such a phenomenon that the preceding ink droplets having been applied onto the printing medium are pushed aside by the subsequent ink droplets impacted later thereon can be reduced, so that it is possible to suppress disturbance of a shape of ink dots. In the Patent Literature 1, although the influence exerted on the printed characters or images by a shape of the ink dots and misregistration of the ink droplets impacted was evaluated, there has been made no concrete study on color bleeding of the inks. In addition, in the paragraph [0013] of the Patent Literature 1, it is clearly described that the color bleeding is suppressed by a flocculating effect of the inks which is obtained using the reaction solution, but if no reaction solution is used, considerable deterioration in quality of the printed characters or images is caused owing to the color bleeding.

Also, the ink-jet printing method described in the Patent Literature 2 tends to fail to achieve the task of obtaining good printed characters or images which are free of mottling or color bleeding on the non-liquid absorbing printing medium to a fully satisfactory extent.

The present invention relates to an ink-jet printing method in which good printed characters or images which are free of mottling or color bleeding can be formed on a low-liquid absorbing printing medium without causing any thermal deformation of the low-liquid absorbing printing medium irrespective of a flocculating effect of inks.

The present inventors have found that in an ink-jet printing method in which characters or images are printed on a low-liquid absorbing printing medium, by heating the printing medium to a temperature of from 30 to 75° C. and ejecting two or more kinds of water-based inks which are different in static surface tension from each other in the sequential order from the ink having a higher static surface tension, it is possible to solve the aforementioned conventional problems.

That is, the present invention relates to an ink-jet printing method including the step of printing characters or images on a low-liquid absorbing printing medium using an ink-jet printing apparatus equipped with an ink-jet print head that is capable of ejecting water-based inks onto the low-liquid absorbing printing medium, in which:

the water-based inks each contain a colorant (A), an organic solvent (C) and water;

the ink-jet printing apparatus is loaded with the two or more kinds of water-based inks which are different in static surface tension from each other;

the printing medium is heated to a temperature of from 30 to 75° C.; and the water-based inks are ejected in the sequential order from the water-based ink having a higher static surface tension.

In accordance with the present invention, there is provided an ink-jet printing method in which good printed characters or images which are free of mottling or color bleeding can be formed on a low-liquid absorbing printing medium without causing any thermal deformation of the low-liquid absorbing printing medium.

[Ink-Jet Printing Method]

The ink-jet printing method of the present invention is characterized by including the step of printing characters or images on a low-liquid absorbing printing medium (hereinafter also referred to merely as a "printing medium") using an ink-jet printing apparatus equipped with an ink-jet print head that is capable of ejecting water-based inks (hereinafter also referred to merely as "inks") onto the low-liquid absorbing printing medium, in which:

the water-based inks each contain a colorant (A), an organic solvent (C) and water;

the ink-jet printing apparatus is loaded with the two or more kinds of water-based inks which are different in static surface tension from each other;

the printing medium is heated to a temperature of from 30 to 75° C.; and the water-based inks are ejected in the sequential order from the water-based ink having a higher static surface tension.

In the ink-jet printing method of the present invention, all of the water-based inks used in the method are ejected in the sequential order from the ink having a higher static surface tension.

Meanwhile, the term "printing" as used in the present specification is a concept that includes printing or typing operation for printing characters or images, and the term "printed material" as used in the present specification is a concept that includes printed matters or typed materials on which characters or images are printed.

In addition, the term "low-liquid absorbing" as used in the present specification is intended to include both concepts of "low-liquid absorbing properties" and "non-liquid absorbing properties" for water and/or ink, and the low-liquid absorbing printing medium may be evaluated by determining a water absorption of the printing medium using pure water. More specifically, the low-liquid absorbing printing medium means a printing medium having a water absorption of not less than 0 g/m$^2$ and not more than 10 g/m$^2$, preferably not less than 0 g/m$^2$ and not more than 6 g/m$^2$, as measured under the condition that a contact time between the printing medium and pure water is 100 milliseconds. Incidentally, the aforementioned water absorption of the printing medium may be measured by the method described in Examples below.

Furthermore, the term "aqueous medium" as used in the present specification means such a medium that water has a largest content among components of the medium contained in the ink. The aqueous medium may be constituted of water solely, or may be in the form of a mixed solvent containing water and at least one organic solvent.

The ink-jet printing method of the present invention exhibits such an excellent effect that good printed characters or images which are free of mottling or color bleeding can be formed on a low-liquid absorbing printing medium without causing thermal deformation of the low-liquid absorbing printing medium. The reason why the aforementioned advantageous effect can be attained by the present invention is considered as follows though it is not clearly determined yet.

That is, as described in the present invention, in the case where the low-liquid absorbing printing medium is heated in the printing step, droplets of the ink precedingly impacted onto the printing medium are dried and concentrated during the period until the droplets of the other ink having a different color are subsequently impacted thereon. When the water-based ink is dried and concentrated, water in the water-based ink is evaporated prior to evaporation of the solvent therein to thereby cause a considerable change in composition of the ink. The change in composition of the ink in turn causes gradual reduction of a static surface tension of the ink. For this reason, when the next ink that is still kept in a non-concentrated state is impacted on the printing medium adjacent to the ink precedingly impacted, droplets of these inks that are different in static surface tension from each other are brought into contact with each other. When causing contact between the droplets of the inks that are different in static surface tension from each other, a wetting action of the droplets of the inks takes place along their interface, which tends to result in occurrence of color bleeding between the inks. In consequence, if the static surface tension of the ink subsequently impacted on the printing medium is adjusted in advance so as to be lower than that of the ink precedingly impacted thereon, it is possible to reduce a difference in static surface tension between the inks owing to drying and concentration of the inks. Thus, in the present invention, it is considered that by reducing the difference in static surface tension between the respective color inks during the heating and drying step, it is possible to suppress occurrence of mottling or color bleeding of these inks.

In addition, it is considered that by using an organic solvent containing a glycol ether as the organic solvent (C) and, if required, by further incorporating a silicone-based surfactant as the surfactant (D) into the water-based ink, it is possible to further improve uniformity of printed characters or images owing to spread of ink dots when printed on a non-liquid absorbing printing medium by an ink-jet printing method, and therefore it is possible to obtain good printed characters or images which are free of mottling.

<Water-Based Inks>

The water-based inks used in the present invention each contain the colorant (A), the organic solvent (C) and water.

<Colorant (A)>

As the colorant (A) in the respective water-based inks, there may be used either a pigment or a dye. From the viewpoint of imparting good weathering resistance and good water resistance to printed materials, the pigment is preferably used.

The pigment used in the present invention may be either an inorganic pigment or an organic pigment. The inorganic or organic pigment may also be used in combination with an extender pigment, if required.

Examples of the inorganic pigment include carbon blacks, metal oxides, metal sulfides and metal chlorides. Of these inorganic pigments, in particular, carbon blacks are preferably used for black inks. The carbon blacks may include furnace blacks, thermal lamp blacks, acetylene blacks and channel blacks. In addition, examples of the inorganic pigment for a white ink include metal oxides such as titanium oxide, zinc oxide, silica, alumina and magnesium oxide, etc. Among these inorganic pigments for a white ink, preferred is titanium oxide.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments. The hue of the organic pigment used in the present invention is not particularly limited, and there may be used any chromatic organic pigment having a yellow color, a magenta color, a cyan color, a blue color, a red color, an orange color, a green color, etc. Specific examples of the preferred chromatic organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green with various product numbers.

The aforementioned pigments and dyes may be respectively used alone or in the form of a mixture of any two or more thereof.

The pigment used in the respective water-based inks may be employed in the form of at least one pigment selected from the group consisting of a self-dispersible pigment, and particles formed by dispersing a pigment with the polymer (B).

The polymer (B) may be used as a pigment dispersing polymer (B-1) for dispersing the pigment and a fixing aid polymer (B-2) for improving fixing properties of the resulting printed characters or images. These polymers (B-1) and (B-2) may be used in combination with each other.

From the viewpoint of obtaining good printed characters or images which are free of mottling or color bleeding, the pigment is preferably contained in the respective water-based inks in the form of particles of a pigment-containing water-insoluble polymer (BX).

[Self-Dispersible Pigment]

The self-dispersible pigment means a pigment onto a surface of which at least one hydrophilic functional group (including an anionic hydrophilic group such as a carboxy group or a cationic hydrophilic group such as a quaternary ammonium group) is bonded either directly or through the other atom group such as an alkanediyl group having 1 to 12 carbon atoms to thereby render the pigment dispersible in an aqueous medium without using a surfactant or a resin.

Specific examples of commercially available products of the self-dispersible pigment include "CAB-O-JET" series products available from Cabot Japan K.K. The self-dispersible pigment is preferably used in the form of a pigment water dispersion prepared by dispersing the pigment in water.

[Particles Formed by Dispersing Pigment with Polymer (B)]

Examples of the configuration of the particles formed by dispersing the pigment with the polymer (B) include 1) particles formed by kneading the pigment and the polymer and then dispersing the resulting kneaded material in a medium such as water; 2) particles formed by stirring the pigment and the polymer in a medium such as water to disperse the pigment in the medium such as water; 3) particles formed by mechanically dispersing a polymer raw material and the pigment to polymerize the polymer raw material and then dispersing the pigment in a medium such as water with the resulting polymer; and the like.

In addition, from the viewpoint of improving storage stability of the particles in the respective water-based inks, a crosslinking agent may be added to the particles formed by dispersing the pigment with the polymer to subject the polymer to crosslinking reaction.

[Polymer (B)]

As the polymer (B), there may be mentioned at least one polymer selected from the group consisting of condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, preferred are vinyl-based polymers.

The weight-average molecular weight of the polymer (B) is preferably not less than 10,000, more preferably not less than 20,000, even more preferably not less than 30,000 and further even more preferably not less than 40,000, and is also preferably not more than 2,500,000 and more preferably not more than 1,000,000, from the viewpoint of improving dispersibility of the pigment as well as from the viewpoint of improving fixing properties of the resulting printed characters or images.

[Pigment Dispersing Polymer (B-1)]

As the pigment dispersing polymer (B-1), there may be mentioned at least one polymer selected from the group consisting of condensation-based resins such as polyesters and polyurethanes, and vinyl-based polymers, etc. Among these polymers, from the viewpoint of improving dispersion stability of the pigment, preferred are vinyl-based polymers obtained by addition-polymerizing a vinyl monomer (such as vinyl compounds, vinylidene compounds and vinylene compounds). The pigment dispersing polymer (B-1) used herein may be in the form of either an appropriately synthetized product or a commercially available product.

The weight-average molecular weight of the pigment dispersing polymer (B-1) is preferably not less than 20,000, more preferably not less than 30,000 and even more preferably not less than 40,000, and is also preferably not more than 500,000, more preferably not more than 300,000 and even more preferably not more than 200,000, from the viewpoint of improving dispersibility of the pigment.

Examples of the commercially available products of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.

[Fixing Aid Polymer (B-2)]

The fixing aid polymer (B-2) is preferably used in the form of pigment-free polymer particles. The dispersion of the fixing aid polymer (B-2) serves for forming a film of the ink on a printing medium to thereby improve fixing properties of the ink.

As the fixing aid polymer (B-2), there may be mentioned at least one polymer selected from the group consisting of condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, from the viewpoint of promoting drying of the ink on a printing medium and improving fixing properties of the resulting printed characters or images, preferred are acrylic resins.

In addition, from the viewpoint of enhancing productivity of the water-based inks, the fixing aid polymer (B-2) is preferably used in the form of a dispersion containing the polymer particles. As the fixing aid polymer (B-2), there may be used either synthetized products obtained, for example, by emulsion polymerization method, etc., or commercially available products.

Examples of the commercially available products of the fixing aid polymer (B-2) include acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd.; styrene-butadiene resins such as "SR-100" and "SR-102" both available from Nippon A & L Inc.; styrene-acrylic resins such as "JONCRYL 7100", "JONCRYL 7600", "JONCRYL 537J", "JONCRYL 538J", "JONCRYL 780" and "JONCRYL PDX-7164" all available from BASF Japan, Ltd.; and vinyl chloride-based resins such as "VINYBLAN 700" and "VINYBLAN 701" both available from Nissin Chemical Co., Ltd., etc.

The fixing aid polymer (B-2) may be used in the form of particles dispersed in water.

The weight-average molecular weight of the fixing aid polymer (B-2) is preferably not less than 10,000, more preferably not less than 20,000 and even more preferably not less than 30,000, and is also preferably not more than 2,500,000 and more preferably not more than 1,000,000, from the viewpoint of improving fixing properties of the resulting ink.

In addition, the average particle size of particles of the fixing aid polymer (B-2) in the dispersion containing the particles of the fixing aid polymer (B-2) or in the resulting ink is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

<Water-Insoluble Polymer (BX)>

The water-insoluble polymer (BX) is preferably used in the from of pigment-containing water-insoluble polymer particles (hereinafter also referred to merely as "pigment-containing polymer particles") from the viewpoint of obtaining good printed characters or images which are free of mottling or color bleeding. The term "water-insoluble" as used herein means that the polymer has a solubility in water of not more than 10 g, preferably not more than 5 g and more preferably not more than 1 g when the polymer is dried to constant weight and then dissolved in 100 g of water at 25° C. In the case where the water-insoluble polymer (BX) is in the form of an anionic polymer, the solubility thereof means a solubility of the polymer whose anionic groups are neutralized completely (i.e., 100%) with NaOH.

As the water-insoluble polymer (BX), from the viewpoint of improving storage stability of the resulting ink, preferred is a vinyl-based polymer obtained by addition-polymerizing a vinyl monomer. The vinyl-based polymer is preferably a vinyl-based polymer that is produced by copolymerizing a monomer mixture containing (b-1) an ionic monomer and (b-2) a hydrophobic monomer. The vinyl-based polymer contains a constitutional unit derived from the component (b-1) and a constitutional unit derived from the component (b-2). In particular, it is preferred that the vinyl-based polymer further contains a constitutional unit derived from (b-3) a macromonomer.

Examples of the ionic monomer (b-1) include anionic monomers and cationic monomers. Among these monomers, preferred are anionic monomers. Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid and 2-methacryloyloxymethylsuccinic acid. Among the aforementioned anionic monomers, from the viewpoint of improving dispersion stability of the pigment-containing polymer particles in the ink, preferred are the carboxylic acid monomers, and more preferred are acrylic acid and methacrylic acid.

As the hydrophobic monomer (b-2), there may be mentioned at least one monomer selected from the group consisting of alkyl (meth)acrylic acid esters and aromatic group-containing monomers.

The alkyl (meth)acrylic acid esters are preferably those alkyl (meth)acrylic acid esters containing an alkyl group having 1 to 22 carbon atoms. Examples of the alkyl (meth)acrylic acid esters include methyl (meth)acrylate, ethyl (meth)acrylate, propyl (meth)acrylate, butyl (meth)acrylate, amyl (meth)acrylate, cyclohexyl (meth)acrylate, 2-ethylhexyl (meth)acrylate, octyl (meth)acrylate, decyl (meth)acrylate, dodecyl (meth)acrylate and (iso)stearyl (meth)acrylate.

The aromatic group-containing monomer is preferably a vinyl monomer containing an aromatic group having 6 to 22 carbon atoms which may contain a substituent group having a hetero atom, and more preferably a styrene-based monomer and an aromatic group-containing (meth)acrylic acid ester.

As the styrene-based monomer, preferred are styrene, 2-methyl styrene and divinyl benzene, and more preferred is styrene. As the aromatic group-containing (meth)acrylic acid ester, preferred are benzyl (meth)acrylate and phenoxyethyl (meth)acrylate, and more preferred is benzyl (meth)acrylate.

The macromonomer (b-3) is in the form of a compound containing a polymerizable functional group at one terminal end thereof and having a number-average molecular weight of not less than 500 and not more than 100,000. The polymerizable functional group bonded to one terminal end of the macromonomer is preferably an acryloyloxy group or a methacryloyloxy group.

The macromonomer (b-3) preferably has a number-average molecular weight of not less than 1,000 and not more than 10,000. Meanwhile, the number-average molecular weight of the macromonomer (b-3) may be measured by gel permeation chromatography using polystyrene as a reference standard substance.

As the macromonomer (b-3), from the viewpoint of improving dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described as to the aforementioned hydrophobic monomer (b-2). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

From the viewpoint of improving dispersion stability of the pigment-containing polymer particles in the ink, it is preferred that (b-4) a nonionic monomer is further used as a monomer component of the water-insoluble polymer (BX).

Examples of the component (b-4) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth)acrylate, an alkoxy polyalkylene glycol (meth) acrylate such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate.

Specific examples of commercially available products of the component (b-4) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation.

The aforementioned components (b-1) to (b-4) may be respectively used alone or in the form of a mixture of any two or more thereof.

The contents of the constitutional units derived from the components (b-1) to (b-4) in the water-insoluble polymer (BX) are as follows, from the viewpoint of improving dispersion stability of the pigment-containing polymer particles in the resulting ink.

The content of the component (b-1) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

The content of the component (b-2) is preferably not less than 25% by mass, more preferably not less than 30% by mass and even more preferably not less than 35% by mass, and is also preferably not more than 60% by mass, more preferably not more than 55% by mass and even more preferably not more than 50% by mass.

The content of the component (b-3) is not less than 0% by mass, preferably not less than 5% by mass, more preferably not less than 8% by mass and even more preferably not less than 10% by mass, and is also preferably not more than 30% by mass, more preferably not more than 25% by mass and even more preferably not more than 20% by mass.

The content of the component (b-4) is not less than 0% by mass, preferably not less than 5% by mass, more preferably not less than 10% by mass and even more preferably not less than 15% by mass, and is also preferably not more than 50% by mass, more preferably not more than 45% by mass and even more preferably not more than 40% by mass.

[Production of Water-Insoluble Polymer (BX)]

The water-soluble polymer (BX) may be produced by copolymerizing the aforementioned monomers by known polymerization methods, for example, by a solution polymerization method. The water-insoluble polymer (BX) thus produced is preferably used as such in the form of a water-insoluble polymer solution without removing the solvent used in the polymerization reaction therefrom in order to use the organic solvent contained therein as an organic solvent in the below-mentioned step 1, from the viewpoint of enhancing productivity of the below-mentioned water dispersion of the pigment-containing polymer particles.

The weight-average molecular weight of the water-insoluble polymer (BX) is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000, from the viewpoint of obtaining good printed characters or images which are free of mottling or color bleeding.

Examples of the configuration of the water-insoluble polymer (BX) present in the respective water-based inks include the particle configuration in which the pigment is enclosed or encapsulated in the polymer, the particle configuration in which the pigment is uniformly dispersed in the polymer, the particle configuration in which the pigment is exposed onto a surface of the respective polymer particles, the configuration in which the polymer is adsorbed onto the pigment, and the configuration in which the polymer is unadsorbed onto the pigment, as well as mixtures of these configurations. Among these configurations, from the viewpoint of improving dispersion stability of the pigment, in the present invention, the configuration in which the water-insoluble polymer (BX) is in the form of pigment-containing polymer particles is preferably used, and the pigment-enclosing configuration in which the pigment is incorporated into the water-insoluble polymer (BX) is more preferably used.

[Production of Particles of Pigment-Containing Water-Insoluble Polymer (BX) (Pigment-Containing Polymer Particles)]

The pigment-containing polymer particles can be efficiently produced in the form of a water dispersion thereof by the process including the following steps I and II, and further including the following step III as an optional step.

Step I; subjecting a mixture of the water-insoluble polymer (BX), an organic solvent, a pigment and water (hereinafter also referred to merely as a "pigment mixture") to dispersion treatment to obtain a dispersion of pigment-containing polymer particles;

Step II; removing the organic solvent from the dispersion obtained in the step I to obtain a water dispersion of the pigment-containing polymer particles (hereinafter also referred to merely as a "pigment water dispersion"); and Step III; mixing the water dispersion obtained in the step II with a crosslinking agent to subject the polymer to crosslinking treatment, thereby obtaining a water dispersion of the crosslinked polymer.

(Step I)

In the step I, there is preferably used the method in which the water-insoluble polymer (BX) is first dissolved in the organic solvent, and then the pigment and water, if required, together with a neutralizing agent, a surfactant and the like, are added and mixed in the resulting organic solvent solution to obtain a dispersion of an oil-in-water type.

The organic solvent in which the water-insoluble polymer (BX) can be dissolved is not particularly limited. When the water-insoluble polymer is synthesized by the solution polymerization method, the solvent used in the polymerization method may be directly used as such in the step I.

In the case where the water-insoluble polymer (BX) is an anionic polymer, an anionic group contained in the water-insoluble polymer may be neutralized using a neutralizing agent. Examples of the neutralizing agent include hydroxides of alkali metals, ammonia and organic amines.

The method of conducting the dispersion treatment used in the step I is not particularly limited. It is preferred that the pigment mixture is first subjected to preliminary dispersion treatment, and then to substantial dispersion treatment by applying a shear stress thereto so as to control the average particle size of the obtained pigment particles to a desired value. Examples of the disperser used in the preliminary dispersion treatment include ordinary mixing and stirring devices such as anchor blades and disper blades. Of these devices, preferred are high-speed stirring mixers.

Examples of the disperser used in the substantial dispersion treatment include kneading machines such as roll mills and kneaders, high-pressure homogenizers such as "MICROFLUIDIZER" available from Microfluidics Corporation, and media-type dispersers such as paint shakers and beads mills. Among these devices, from the viewpoint of reducing a particle size of the pigment, the high-pressure homogenizers are preferably used. In the case where the substantial dispersion treatment is conducted using the high-pressure homogenizer, the particle size of the pigment can be adjusted to a desired value by controlling the treating pressure and the number of passes through the homogenizer.

(Step II)

In the step II, the organic solvent is removed from the dispersion obtained in the step I by any conventionally known methods to obtain a pigment water dispersion. The organic solvent is preferably substantially completely removed from the thus obtained pigment water dispersion. However, the residual organic solvent may be present in the pigment water dispersion unless the objects and advantageous effects of the present invention are adversely affected by the residual organic solvent.

In the thus obtained pigment water dispersion, the water-insoluble polymer (BX) in the form of solid particles containing the pigment is dispersed in a medium containing water as a main medium. The configuration of the pigment-containing polymer particles in the pigment water dispersion is not particularly limited, and the pigment-enclosing configuration in which the pigment is incorporated into the polymer is preferred as described previously.

(Step III)

The step III is an optional step. The step III is preferably carried out from the viewpoint of improving storage stability of the pigment water dispersion and the resulting ink.

In the case where the water-insoluble polymer (BX) is an anionic water-insoluble polymer containing an anionic group, the crosslinking agent used in the step III is preferably in the form of a compound containing a functional group that is capable of reacting with the anionic group of the polymer, more preferably a compound containing the two or more functional groups in a molecule thereof and even more preferably a compound containing the 2 to 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are compounds containing two or more epoxy groups in a molecule thereof, and more preferred is trimethylolpropane polyglycidyl ether.

The solid content of the resulting pigment water dispersion is preferably not less than 10% by mass and more preferably not less than 15% by mass, and is also preferably not more than 35% by mass and more preferably not more than 30% by mass, from the viewpoint of improving dispersion stability of the pigment water dispersion. Meanwhile, the solid content of the pigment water dispersion may be measured by the method described in Examples below.

The average particle size of the pigment-containing polymer particles in the pigment water dispersion is preferably not less than 40 nm, more preferably not less than 60 nm, even more preferably not less than 80 nm and further even more preferably not less than 85 nm, and is also preferably not more than 150 nm, more preferably not more than 130 nm and even more preferably not more than 125 nm, from the viewpoints of suppressing formation of coarse particles and improving continuous ejection properties of the resulting ink.

Meanwhile, the average particle size of the pigment-containing polymer particles may be measured by the method described in Examples below.

<Organic Solvent (C)>

As the organic solvent (C), those organic solvents having a boiling point of not lower than 90° C. and lower than 250° C. are preferred from the viewpoint of obtaining good printed characters or images which are free of mottling or color bleeding. The boiling point of the organic solvent (C) is more preferably not lower than 130° C., even more preferably not lower than 140° C. and further even more preferably not lower than 150° C., and is also more preferably not higher than 245° C., even more preferably not higher than 240° C. and further even more preferably not higher than 235° C.

Examples of the suitable organic solvent (C) include a polyhydric alcohol (c-1) and a glycol ether (c-2).

(Polyhydric Alcohol (c-1))

Examples of the aforementioned polyhydric alcohol (c-1) include 1,2-alkanediols such as ethylene glycol, propylene glycol, 1,2-butanediol, 1,2-pentanediol and 1,2-hexanediol, diethylene glycol, polyethylene glycol, dipropylene glycol, 1,3-propanediol, 1,3-butanediol, 1,4-butanediol, 3-methyl-1,3-butanediol, 1,5-pentanediol, 2-methyl-2,4-pentanediol, 1,2,6-hexanetriol, 1,2,4-butanetriol, 1,2,3-butanetriol and petriol.

Among these polyhydric alcohols, from the viewpoint of improving storage stability and continuous ejection properties of the resulting ink, preferred is at least one compound selected from the group consisting of alkanediols having not less than 2 and not more than 6 carbon atoms, such as propylene glycol (boiling point (b.p.): 188° C.), diethylene glycol (b.p.: 245° C.) and 1,2-hexanediol (b.p.: 223° C.), and polypropylene glycols having a molecular weight of 500 to 1000, and more preferred is at least one compound selected from the group consisting of 1,2-alkanediols having not less than 3 and not more than 4 carbon atoms, such as propylene glycol and diethylene glycol, and the aforementioned polypropylene glycols.

(Glycol Ether (c-2))

Specific examples of the glycol ether (c-2) include at least one compound selected from the group consisting of alkylene glycol monoalkyl ethers and alkylene glycol dialkyl ethers. Among these glycol ethers, from the viewpoint of improving continuous ejection properties of the resulting ink as well as from the viewpoint of obtaining good printed characters or images which are free of mottling or color bleeding, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include at least one compound selected from the group consisting of ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol isobutyl ether, diethylene glycol butyl ether, triethylene glycol methyl ether, dipropylene glycol butyl ether, dipropylene glycol methyl ether and tripropylene glycol methyl ether.

Of these alkylene glycol monoalkyl ethers, preferred is at least one compound selected from the group consisting of ethylene glycol isopropyl ether (b.p.: 144° C.), ethylene glycol propyl ether (b.p.: 151° C.), diethylene glycol methyl ether (b.p.: 194° C.), diethylene glycol isopropyl ether (b.p.: 207° C.), diethylene glycol isobutyl ether (b.p.: 230° C.) and diethylene glycol butyl ether (b.p.: 230° C.), and more preferred is at least one compound selected from the group consisting of ethylene glycol isopropyl ether, diethylene glycol isopropyl ether and diethylene glycol isobutyl ether.

(Other Organic Solvents)

In the present invention, the respective water-based inks may also contain, in addition to the aforementioned organic solvent (C), those organic solvents that may be usually compounded in the water-based inks, such as the other alcohols, alkyl ethers of the alcohols, glycol ethers, nitrogen-containing heterocyclic compounds such as NMP, amides, amines and sulfur-containing compounds.

For example, 1,6-hexanediol (b.p.: 250° C.), triethylene glycol (b.p.: 285° C.), tripropylene glycol (b.p.: 273° C.), polypropylene glycol (b.p.: not lower than 250° C.) and glycerin (b.p.: 290° C.), etc., may be used in combination with the aforementioned organic solvent having a boiling point of lower than 250° C.

<Surfactant (D)>

The respective water-based inks used in the present invention preferably further contain a surfactant (D) from the viewpoint of obtaining good printed characters or images which are free of mottling or color bleeding. As the surfactant (D), there are preferably used those surfactants including a silicone-based surfactant (d-1).

Any suitable silicone-based surfactants may be appropriately selected and used as the silicone-based surfactant (d-1) according to the objects and applications of the water-based inks. Among these silicone-based surfactants, from the viewpoint of suppressing increase in viscosity of the resulting inks, improving continuous ejection properties of the inks and obtaining good printed characters or images which are free of mottling or color bleeding, a polyether-modified silicone-based surfactant is preferably used.

(Polyether-Modified Silicone-Based Surfactant)

The polyether-modified silicone-based surfactant is capable of suppressing increase in viscosity of the resulting inks and occurrence of color bleeding between the inks. Therefore, it is considered that the polyether-modified silicone-based surfactant contributes to production of good printed materials that are free of mottling or color bleeding upon high-speed printing.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

The HLB value of the polyether-modified silicone-based surfactant is preferably not less than 3.0, more preferably not less than 4.0 and even more preferably not less than 4.5 from the viewpoint of improving solubility of the polyether-modified silicone-based surfactant in the respective water-based inks. The term "HLB" as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

$$HLB = 20 \times [(\text{molecular weight of hydrophilic group contained in surfactant})/(\text{molecular weight of surfactant})]$$

Specific examples of the polyether-modified silicone-based surfactant include "KF" series products available from Shin-Etsu Chemical Co., Ltd., "SILFACE SAG" available from Nissin Chemical Co., Ltd., and "BYK" series products available from BYK Chemie Japan K.K.

(Other Surfactants)

In the present invention, the polyether-modified silicone-based surfactant may be used in combination with the other surfactants. Among the surfactants other than the polyether-modified silicone-based surfactant, preferred is a nonionic surfactant.

Examples of the nonionic surfactant include (1) alkyl ethers and alkenyl ethers of polyoxyalkylenes which are produced by adding an alkyleneoxide to an aliphatic or aromatic alcohol having 8 to 22 carbon atoms or a polyhydric alcohol, (2) esters of an alcohol containing a hydrocarbon group having 8 to 22 carbon atoms, and a polyvalent fatty acid, (3) polyoxyalkylene aliphatic amines containing an alkyl group or alkenyl group having 8 to 20 carbon atoms, and (4) ester compounds of a higher fatty acid having 8 to 22 carbon atoms and a polyhydric alcohol, or compounds produced by adding an alkyleneoxide to the ester compounds.

Examples of commercially available products of the nonionic surfactant include "SURFYNOL" series products available from Nissin Chemical Co., Ltd., "ACETYLENOL" series products available from Kawaken Fine Chemicals Co., Ltd., and "EMULGEN 120" (polyoxyethylene lauryl ether) available from Kao Corporation.

[Contents of Respective Components in Water-Based Inks and Properties of Water-Based Inks]

The respective water-based inks used in the present invention may be obtained by appropriately mixing the aforementioned components and then stirring the resulting mixture. The contents of the respective components in the resulting water-based inks as well as various properties of the water-based inks are as follows.

(Content of Pigment (A))

The content of the pigment (A) in the respective water-based inks is preferably not less than 2.0% by mass, more preferably not less than 4.0% by mass and even more preferably not less than 6.0% by mass from the viewpoint of enhancing optical density of the water-based inks upon printing. Also, the content of the pigment (A) in the respective water-based inks is preferably not more than 30.0% by mass, more preferably not more than 20% by mass, even more preferably not more than 15% by mass and further even more preferably not more than 10.0% by mass from the viewpoint of reducing viscosity of the water-based inks upon volatilization of the solvent therefrom as well as from the viewpoint of improving continuous ejection properties of the water-based inks and obtaining good printed characters or images which are free of mottling or color bleeding.

(Content of Polymer (B))

The content of the polymer (B) in the respective water-based inks is preferably not less than 1.0% by mass, more preferably not less than 2.0% by mass and even more preferably not less than 3.0% by mass, and is also preferably not more than 20% by mass, more preferably not more than 13% by mass and even more preferably not more than 8.0% by mass, from the viewpoint of improving fixing properties of the water-based inks.

In the case where the polymer (B) is used as the pigment dispersing polymer (B-1), the content of the pigment dispersing polymer (B-1) in the respective water-based inks is preferably not less than 0.01% by mass, more preferably not less than 0.05% by mass and even more preferably not less than 0.1% by mass, and is also preferably not more than 10% by mass, more preferably not more than 7.0% by mass and even more preferably not more than 5.0% by mass, from the viewpoint of improving fixing properties of the water-based inks.

In the case where the polymer (B) is used as the fixing aid polymer (B-2), the content of the fixing aid polymer (B-2) in the respective water-based inks is preferably not less than 0.9% by mass, more preferably not less than 1.0% by mass and even more preferably not less than 1.2% by mass, and is also preferably not more than 10% by mass, more preferably not more than 6.0% by mass and even more preferably not more than 3.0% by mass, from the viewpoint of improving fixing properties of the water-based inks.

Meanwhile, when using the particles of the pigment-containing water-insoluble polymer (BX), the content of the polymer (B) in the respective water-based inks as used herein means a total content of the pigment dispersing polymer (B-1) of the pigment-containing polymer particles and the fixing aid polymer (B-2).

(Content of Organic Solvent (C))

The content of the organic solvent (C) in the respective water-based inks is preferably not less than 15% by mass, more preferably not less than 20% by mass and even more preferably not less than 25% by mass, and is also preferably not more than 45% by mass, more preferably not more than 40% by mass and even more preferably not more than 35% by mass, from the viewpoint of improving continuous ejection properties of the resulting water-based inks.

The content of the polyhydric alcohol (c-1) in the respective water-based inks is preferably not less than 10% by mass, more preferably not less than 15% by mass and even more preferably not less than 20% by mass, and is also preferably not more than 45% by mass, more preferably not more than 40% by mass and even more preferably not more than 35% by mass, from the viewpoint of improving storage stability and continuous ejection properties of the resulting water-based inks.

The content of the glycol ether (c-2) in the respective water-based inks is preferably not less than 1% by mass, more preferably not less than 2% by mass and even more preferably not less than 3% by mass, and is also preferably not more than 15% by mass, more preferably not more than 12% by mass and even more preferably not more than 8% by mass, from the viewpoint of improving storage stability and continuous ejection properties of the resulting water-based inks.

The content of a high-boiling organic solvent having a boiling point of not lower than 250° C. in the respective water-based inks used in the present invention is preferably not more than 5% by mass, more preferably not more than 4% by mass and even more preferably not more than 3% by mass from the viewpoint of imparting adequate drying properties to the water-based inks upon high-speed printing and obtaining good printed characters or images which are free of mottling or color bleeding.

(Content of Surfactant (D))

The content of the surfactant (D) in the respective water-based inks is preferably not less than 0.1% by mass, more preferably not less than 0.2% by mass and even more preferably not less than 0.5% by mass, and is also preferably not more than 5% by mass, more preferably not more than 4% by mass, even more preferably not more than 3% by mass and further even more preferably not more than 2.5% by mass, from the viewpoint of suppressing increase in viscosity of the water-based inks and improving continuous ejection properties of the water-based inks as well as from the viewpoint of obtaining good printed characters or images which are free of mottling or color bleeding.

The content of the silicone-based surfactant (d-1) in the respective water-based inks is preferably not less than 0.005% by mass, more preferably not less than 0.03% by mass and even more preferably not less than 0.04% by mass, and is also preferably not more than 0.5% by mass, more preferably not more than 0.4% by mass and even more preferably not more than 0.3% by mass, from the same viewpoint as described above.

The content of the polyether-modified silicone-based surfactant in the respective water-based inks is preferably not less than 0.01% by mass, more preferably not less than 0.02% by mass and even more preferably not less than 0.03% by mass, and is also preferably not more than 0.5% by mass, more preferably not more than 0.4% by mass and even more preferably not more than 0.2% by mass, from the same viewpoint as described above.

The content of the nonionic surfactant (d-2) in the respective water-based inks is preferably not less than 0.1% by mass, more preferably not less than 0.8% by mass and even more preferably not less than 1.5% by mass, and is also preferably not more than 5% by mass, more preferably not more than 3.5% by mass and even more preferably not more than 2.5% by mass, from the same viewpoint as described above.

(Content of Water)

The content of water in the respective water-based inks is preferably not less than 20% by mass, more preferably not less than 30% by mass and even more preferably not less than 40% by mass, and is also preferably not more than 85% by mass, more preferably not more than 80% by mass and even more preferably not more than 75% by mass, from the viewpoint of improving continuous ejection properties and storage stability of the water-based inks as well as from the viewpoint of obtaining good printed characters or images which are free of mottling or color bleeding.

The respective water-based inks used in the present invention may also contain, in addition to the aforementioned components, various ordinary additives such as a humectant, a wetting agent, a penetrant, a defoaming agent, an antiseptic agent, a mildew-proof agent and a rust preventive.

The respective water-based inks used in the present invention preferably contain no radical-polymerizable compound from the viewpoint of improving safety and reducing occurrence of unpleasant smell upon printing characters or images on food packages, etc.

<Properties of Water-Based Inks>

In the ink-jet printing method of the present invention, there are used two or more kinds of water-based inks which are selected from the group consisting of a black ink, a white ink and chromatic inks and are different in static surface tension from each other. The water-based inks are preferably constituted of three or more kinds of water-based inks, and more preferably four or more kinds of water-based inks, and are also preferably constituted of eight or less kinds of water-based inks, and more preferably seven or less kinds of water-based inks. Examples of a combination of a plurality of the water-based inks include the combination of four kinds of water-based inks including a black ink, a cyan ink, a magenta ink and a yellow ink, the combination of five kinds of water-based inks including a black ink, a cyan ink, a magenta ink, a yellow ink and a white ink, the combination of seven kinds of water-based inks including a black ink, a cyan ink, a magenta ink, a yellow ink, a red ink, a green ink and a blue ink, and the combination of eight kinds of water-based inks including a black ink, a cyan ink, a magenta ink, a yellow ink, a red ink, a green ink, a blue ink and a white ink.

From the viewpoint of obtaining good printed characters or images which are free of mottling or color bleeding as well as from the viewpoint of improving ejection properties of the water-based inks, the static surface tension of the respective water-based inks as measured at 20° C. is preferably not less than 22 mN/m, more preferably not less than 24 mN/m and even more preferably not less than 25 mN/m, and is also preferably not more than 45 mN/m, more preferably not more than 40 mN/m and even more preferably not more than 35 mN/m.

The difference in static surface tension between the aforementioned two or more kinds of water-based inks is preferably not less than 0.1 mN/m, more preferably not less than 0.2 mN/m and even more preferably not less than 0.3 mN/m from the viewpoint of obtaining good printed characters or images which are free of mottling or color bleeding.

The static surface tension of the respective inks may be adequately controlled, for example, by suitably selecting the kind or content of the organic solvent (C) or the surfactant (D).

The average particle size of the particles contained in the respective water-based inks is preferably not less than 40 nm, more preferably not less than 60 nm and even more preferably not less than 80 nm, and is also preferably not more than 250 nm, more preferably not more than 220 nm, even more preferably not more than 200 nm and further even more preferably not more than 180 nm, from the viewpoint of improving storage stability and ejection properties of the water-based inks.

Meanwhile, the average particle size and static surface tension of the respective water-based inks may be measured by the methods described in Examples below.

The viscosity of the respective water-based inks as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving continuous ejection properties of the water-based inks.

The pH value of the respective water-based inks is preferably not less than 7.0, more preferably not less than 8.0, even more preferably not less than 8.5 and further even more preferably not less than 8.7 from the viewpoint of improving storage stability and the like of the water-based inks as well as from the viewpoint of obtaining good printed characters or images which are free of mottling or color bleeding, and is also preferably not more than 11.0 and more preferably not more than 10.0 from the viewpoint of improving resistance of members to the water-based inks and suppressing skin irritation.

<Ink-Jet Printing Method>

The ink-jet printing method of the present invention is the method of printing characters or images on a low-liquid absorbing printing medium using an ink-jet printing apparatus equipped with an ink-jet print head that is capable of ejecting the aforementioned water-based inks onto the low-liquid absorbing printing medium, in which the ink-jet printing apparatus is loaded with the two or more kinds of water-based inks which are different in static surface tension from each other; the printing medium is heated to a temperature of from 30 to 75° C.; and the water-based inks are ejected in the sequential order from the water-based ink having a higher static surface tension.

Thus, in the present invention, by adjusting the static surface tension of the subsequently ejected ink in advance so as to be lower than that of the precedingly ejected ink, it is possible to reduce a difference in static surface tension between the respective color inks during the heating and drying step, and therefore it is possible to suppress occurrence of mottling or color bleeding.

In the present invention, the colorant-containing inks are preferably ejected onto the printing medium that is not subjected to any pretreatments such as application of a treating solution onto the printing medium, to directly print characters or images thereon.

(Low-Liquid Absorbing Printing Medium)

Examples of the low-liquid absorbing printing medium used in the present invention include a low-liquid absorbing coated paper and a low-liquid absorbing resin film. The low-liquid absorbing printing medium may be in the form of either a sheet of paper or a roll of paper. However, from the viewpoint of enhancing productivity of printed materials, a roll-shaped printing medium is preferably used.

Examples of the coated paper include a general-purpose glossy paper "OK Topcoat Plus" (water absorption as measured in a pure water contact time of 100 milliseconds (hereinafter defined in the same way): 4.9 g/m$^2$) available from Oji Paper Co., Ltd., a multi-color foam glossy coated paper (water absorption: 5.2 g/m$^2$) available from Oji Paper Co., Ltd., "UPM Finesse Gloss" (water absorption: 3.1 g/m$^2$) available from UPM, and the like.

As the resin film, there may be used a transparent synthetic resin film. Examples of the transparent synthetic resin film include a polyester film, a polyvinyl chloride film, a polypropylene film, a polyethylene film and a nylon film. These resin films may be in the from of either a biaxially oriented film, a monoaxially oriented film or a non-oriented film. Among these films, preferred are a polyester film and an oriented polypropylene film, and more preferred are a polyester film such as a polyethylene terephthalate (PET) film subjected to corona discharge treatment, and an oriented polypropylene film such as a biaxially oriented polypropylene (OPP) film subjected to corona discharge treatment.

The thickness of the resin film is not particularly limited, and the resin film may be in the form of a thin film having a thickness of not less than 1 μm and less than 20 μm. However, the thickness of the resin film is preferably not less than 20 μm, more preferably not less than 30 μm and even more preferably not less than 35 μm, and is also preferably not more than 100 μm, more preferably not more than 80 μm and even more preferably not more than 75 μm, from the viewpoint of suppressing deterioration in appearance of the printing medium as well as from the viewpoint of improving availability of the printing medium.

Examples of commercially available products of the transparent synthetic resin film include "LUMIRROR T60" (PET) available from Toray Industries, Inc., "TAIKO FE2001" (corona discharge-treated PET) available from Futamura Chemical Co, Ltd., "TAIKO FOR-AQ" (corona discharge-treated OPP) available from Futamura Chemical Co, Ltd., "PVC80B P" (polyvinyl chloride) available from Lintec Corporation, "KINATH KEE 70CA" (polyethylene) available from Lintec Corporation, "YUPO SG90 PAT1" (PP) available from Lintec Corporation and "BONYL RX" (nylon) available from Kohjin Film & Chemicals Co., Ltd., etc.

(Ink-Jet Printing Apparatus)

The ink-jet printing apparatus used in the present invention is loaded with the two or more kinds of water-based inks. The structure in which the ink-jet printing apparatus is loaded with a plurality of the water-based inks means that an ink-jet print head of the ink-jet printing apparatus is provided with discharge ports through which a plurality of the water-based inks can be respectively ejected. For example, in the case where the ink-jet printing apparatus is loaded with the two kinds of water-based inks, the ink-jet print head of the ink-jet printing apparatus is provided with discharge ports through which the two kinds of water-based inks are respectively ejected. In this case, the number of the ink-jet print head(s) may be either 1 or 2. Thus, the ink-jet printing apparatus is loaded with the two or more kinds of water-based inks. From the viewpoint of obtaining good printed characters or images which are free of mottling or color bleeding, the ink-jet printing apparatus is preferably loaded with the three or more kinds of water-based inks, and more preferably loaded with the four or more kinds of water-based inks, and is also preferably loaded with the eight or less kinds of water-based inks, and more preferably loaded with seven or less kinds of water-based inks.

The ink-jet printing apparatus used in the present invention is preferably equipped with not only the ink-jet print head for ejecting the water-based inks onto the printing medium that is transported in a feed direction thereof, but also an under heater for heating the printing medium from a rear side surface of the printing medium which is opposed to a front side surface thereof which faces to the ink-jet print head, for the purpose of heating the printing medium to a temperature of 30 to 75° C.

(Ink-Jet Print Head)

As the ink-jet print head, there may be used a serial-type print head and a line-type print head, and the line-type print head is preferably used in the present invention. In the ink-jet printing system using the line-type print head, while maintaining the print head in a stationery state and moving the printing medium along a transportation direction thereof, droplets of the respective inks are ejected from openings of nozzles of the print head in association with the movement of the printing medium, whereby it is possible to allow the ink droplets to adhere onto the printing medium to print characters or images, etc., by a single-pass (one-pass) method thereon.

The ink droplets are preferably ejected by a piezoelectric method. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method for ejecting the ink droplets.

The voltage applied to the print head is preferably not less than 5 V, more preferably not less than 10 V and even more preferably not less than 15 V, and is also preferably not more than 40 V, more preferably not more than 35 V and even more preferably not more than 30 V, from the viewpoint of conducting the high-speed printing with a high efficiency, etc.

The drive frequency of the print head is preferably not less than 2 kHz, more preferably not less than 5 kHz and even more preferably not less than 8 kHz, and is also preferably not more than 80 kHz, more preferably not more than 70 kHz and even more preferably not more than 60 kHz, from the viewpoint of conducting the high-speed printing with a high efficiency, etc.

(Printing Conditions, etc.)

The amount of the ink droplets ejected is preferably not less than 0.5 pL, more preferably not less than 1.0 pL, even more preferably not less than 1.5 pL and further even more preferably not less than 1.8 pL, and is also preferably not more than 20 pL, more preferably not more than 15 pL and even more preferably not more than 13 pL, as calculated per one ink droplet ejected, from the viewpoint of maintaining accuracy of impact positions of the ink droplets and improving quality of printed characters or images.

The print head resolution is preferably not less than 400 dpi (dot/inch), more preferably not less than 500 dpi and even more preferably not less than 550 dpi.

From the viewpoint of reducing viscosity of the water-based inks and improving continuous ejection properties of the water-based inks, the inside temperature of the print head, preferably a line-type print head, upon the printing, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The surface of the printing medium opposed to an ink-ejecting region of the print head, preferably a line-type print head, from which the respective inks are ejected, is heated to a temperature of not lower than 30° C. from the viewpoint of obtaining good printed characters or images which are free of mottling or color bleeding, and is also heated to a temperature of not higher than 75° C. from the viewpoint of suppressing thermal deformation of the printing medium and saving energy upon production of printed materials. The temperature of the printing medium is preferably controlled to not lower than 35° C., more preferably not lower than 40° C. and even more preferably not lower than 45° C., and is also preferably controlled to not higher than 70° C., more preferably not higher than 65° C., even more preferably not higher than 60° C. and further even more preferably not higher than 55° C.

The temperature of the printing medium may be suitably controlled by adjusting a temperature of the under heater.

The printing speed is usually not less than 5 m/min, preferably not less than 10 m/min, more preferably not less than 20 m/min and even more preferably not less than 30 m/min in terms of a transportation speed of the printing medium in the direction along which the printing medium is moved upon the printing, from the viewpoint of enhancing productivity of printed materials, and is also preferably not more than 75 m/min in terms of a transportation speed of the printing medium in the direction along which the printing medium is moved upon the printing, from the viewpoint of improving operability of the printing apparatus.

The amount of the respective water-based inks deposited on the printing medium is preferably not less than 0.1 g/m$^2$, and is also preferably not more than 25 g/m$^2$ and more preferably not more than 20 g/m$^2$, in terms of an amount of solid components therein, from the viewpoint of improving quality of the printed characters or images and increasing the printing speed.

(Under Heater)

The under heater mounted in the ink-jet printing apparatus is disposed on a rear side surface of the printing medium which is opposed to a front side surface thereof which faces to the print head for the respective water-based inks to heat the printing medium. The under heater may be, for example, in the form of a heater of a hot water type or a heater of a thermoelectric type having a stainless steel or ceramic plate. In the case where a plurality of print heads capable of ejecting a plurality of inks are mounted in the ink-jet printing apparatus, it is preferred that a plurality of under heaters are disposed at corresponding positions opposed to the respective print heads.

The respective under heaters are disposed at a position spaced at a predetermined distance apart from the rear side surface of the printing medium upon the printing. The predetermined distance is preferably not less than 0.05 mm, more preferably not less than 0.1 mm, even more preferably not less than 0.2 mm and further even more preferably not less than 0.4 mm, and is also preferably not more than 5.0 mm, more preferably not more than 4.0 mm, even more preferably not more than 3.0 mm, further even more preferably not more than 2.0 mm and still further even more preferably not more than 1.5 mm.

In the ink-jet printing method of the present invention, in order to avoid occurrence of color bleeding between the respective ink droplets even when ejecting a kind of ink onto a printing medium to print characters or images thereon and then successively ejecting a subsequent ink on the printing medium, the ink-jet printing apparatus may be further equipped with a fixing/curing means for applying a thermal energy to the printing medium, such as a heater.

With respect to the aforementioned embodiments, the present invention further provides the following aspects relating to the ink-jet printing method.

<1> An ink-jet printing method including the step of printing characters or images on a low-liquid absorbing printing medium using an ink-jet printing apparatus equipped with an ink-jet print head that is capable of ejecting water-based inks onto the low-liquid absorbing printing medium, in which:

the water-based inks each contain a colorant (A), an organic solvent (C) and water;

the ink-jet printing apparatus is loaded with the two or more kinds of water-based inks which are different in static surface tension from each other;

the printing medium is heated to a temperature of from 30 to 75° C.; and the water-based inks are ejected in the sequential order from the water-based ink having a higher static surface tension.

<2> The ink-jet printing method according to the aspect <1>, wherein the colorant (A) in the respective water-based inks is present in the form of pigment-containing water-insoluble polymer particles.

<3> The ink-jet printing method according to the aspect <1> or <2>, wherein the organic solvent (C) contains a glycol ether (c-2).

<4> The ink-jet printing method according to any one of the aspects <1> to <3>, wherein a boiling point of the organic solvent (C) is preferably not lower than 90° C., more preferably not lower than 130° C., even more preferably not lower than 140° C. and further even more preferably not lower than 150° C., and is also preferably lower than 250° C., more preferably not higher than 245° C., even more preferably not higher than 240° C. and further even more preferably not higher than 235° C.

<5> The ink-jet printing method according to any one of the aspects <1> to <4>, wherein a content of the organic solvent (C) in the respective water-based inks is preferably not less than 15% by mass, more preferably not less than 20% by mass and even more preferably not less than 25% by mass, and is also preferably not more than 45% by mass, more preferably not more than 40% by mass and even more preferably not more than 35% by mass.

<6> The ink-jet printing method according to any one of the aspects <1> to <5>, wherein the water-based inks each further contain a polymer (B).

<7> The ink-jet printing method according to any one of the aspects <1> to <6>, wherein the polymer (B) is at least one polymer selected from the group consisting of condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins, and preferably a vinyl-based polymer.

<8> The ink-jet printing method according to any one of the aspects <1> to <7>, wherein the polymer (B) is a pigment dispersing polymer (B-1) for dispersing the pigment, a fixing aid polymer (B-2) for improving fixing properties of the printed characters or images, or a combination of the pigment dispersing polymer (B-1) and the fixing aid polymer (B-2).

<9> The ink-jet printing method according to any one of the aspects <1> to <8>, wherein the water-based inks each further contain a surfactant (D).

<10> The ink-jet printing method according to the aspect <9>, wherein the surfactant (D) contains a silicone-based surfactant (d-1).

<11> The ink-jet printing method according to any one of the aspects <2> to <10>, wherein a content of the pigment (A) in the respective water-based inks is preferably not less than 2.0% by mass, more preferably not less than 4.0% by mass and even more preferably not less than 6.0% by mass, and is also preferably not more than 30.0% by mass, more preferably not more than 20% by mass, even more preferably not more than 15% by mass and further even more preferably not more than 10.0% by mass.

<12> The ink-jet printing method according to any one of the aspects <6> to <11>, wherein a content of the polymer (B) in the respective water-based inks is preferably not less than 1.0% by mass, more preferably not less than 2.0% by mass and even more preferably not less than 3.0% by mass, and is also preferably not more than 20% by mass, more preferably not more than 13% by mass and even more preferably not more than 8.0% by mass.

<13> The ink-jet printing method according to any one of the aspects <1> to <12>, wherein a content of the organic solvent (C) in the respective water-based inks is preferably not less than 15% by mass, more preferably not less than 20% by mass and even more preferably not less than 25% by mass, and is also preferably not more than 45% by mass, more preferably not more than 40% by mass and even more preferably not more than 35% by mass.

<14> The ink-jet printing method according to any one of the aspects <9> to <13>, wherein a content of the surfactant (D) in the respective water-based inks is preferably not less than 0.1% by mass, more preferably not less than 0.2% by mass and even more preferably not less than 0.5% by mass, and is also preferably not more than 5% by mass, more preferably not more than 4% by mass, even more preferably not more than 3% by mass and further even more preferably not more than 2.5% by mass.

<15> The ink-jet printing method according to any one of the aspects <1> to <14>, wherein a content of water in the respective water-based inks is preferably not less than 20% by mass, more preferably not less than 30% by mass and even more preferably not less than 40% by mass, and is also preferably not more than 85% by mass, more preferably not more than 80% by mass and even more preferably not more than 75% by mass.

<16> The ink-jet printing method according to any one of the aspects <1> to <15>, wherein the water-based inks preferably each contain no radical-polymerizable compound.

<17> The ink-jet printing method according to any one of the aspects <1> to <16>, wherein a static surface tension of the respective water-based inks as measured at 20° C. is preferably not less than 22 mN/m, more preferably not less than 24 mN/m and even more preferably not less than 25 mN/m, and is also preferably not more than 45 mN/m, more preferably not more than 40 mN/m and even more preferably not more than 35 mN/m.

<18> The ink-jet printing method according to any one of the aspects <1> to <17>, wherein a difference in static surface tension between the two or more kinds of water-based inks is preferably not less than 0.1 mN/m, more preferably not less than 0.2 mN/m and even more preferably not less than 0.3 mN/m.

<19> The ink-jet printing method according to any one of the aspects <1> to <18>, wherein a viscosity of the respective water-based inks as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s.

<20> The ink-jet printing method according to any one of the aspects <1> to <19>, wherein the low-liquid absorbing printing medium is a polyester film subjected to corona discharge treatment, or an oriented polypropylene film subjected to corona discharge treatment.

<21> The ink-jet printing method according to any one of the aspects <1> to <20>, wherein the respective colorant-containing inks are ejected onto the printing medium that is not subjected to any pretreatments.

<22> The ink-jet printing method according to any one of the aspects <1> to <21>, wherein the printing medium is heated by the ink-jet print head that is capable of ejecting the water-based inks onto the printing medium and an under heater that is disposed on a rear side surface of the printing medium opposed to a front side surface thereof which faces to the ink-jet print head.

<23> The ink-jet printing method according to any one of the aspects <1> to <22>, wherein a printing speed is not less than 5 m/min and not more than 75 m/min in terms of a transportation speed of the printing medium.

<24> The ink-jet printing method according to any one of the aspects <1> to <23>, wherein the characters or images are printed on the printing medium by a single-pass (one-pass) method.

EXAMPLES

In the following Production Examples, Examples and Comparative Examples, the "part(s)" and "%" indicate "part(s) by mass" and "% by mass", respectively, unless otherwise specified. Meanwhile, the methods of measuring respective properties and characteristics are as follows.

(1) Measurement of Weight-Average Molecular Weight of Water-Insoluble Polymer

The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using monodisperse polystyrenes having previously known molecular weights as a reference standard substance.

(2) Measurement of Solid Content of Pigment Water Dispersion

Sodium sulfate dried to constant weight in a desiccator was weighed in an amount of 10.0 g and charged into a 30 mL polypropylene container (ϕ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(3) Measurement of Average Particle Sizes of Pigment-Containing Polymer Particles and Polymer Particles The particles were subjected to cumulant analysis using a laser particle analyzing system "ELS-8000" available from Otsuka Electrics Co., Ltd., to measure an average particle size thereof. The above measurement was conducted under the conditions including a temperature of 25° C., an angle between incident light and detector of 90° and a cumulative number of 100 times, and a refractive index of water (1.333)

was input to the analyzing system as a refractive index of the dispersing medium. The measurement was also conducted by adjusting a concentration of the dispersion to be measured to $5\times10^{-3}$% by mass in terms of a solid content thereof.

(4) Measurement of Viscosity of Water-Based Ink

The viscosity of the water-based ink was measured at 32° C. using an E-type viscometer "TV-25" (equipped with a standard cone rotor (1° 34'×R24); rotating speed: 50 rpm) available from Toki Sangyo Co., Ltd.

(5) Measurement of Static Surface Tension of Water-Based Ink

A platinum plate was dipped in 5 g of the water-based ink filled in a cylindrical polyethylene container (3.6 cm in diameter×1.2 cm in depth), and the static surface tension of the water-based ink was measured at 20° C. using a surface tension meter "CBVP-Z" (tradename) available from Kyowa Interface Science Co., Ltd.

(6) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

(7) Water Absorption of Printing Medium as Measured in Pure Water Contact Time of 100 Milliseconds Using an automatic scanning absorptometer "KM500win" available from Kumagai Riki Kogyo Co., Ltd., the amount of pure water transferred to a printing medium when contacted with pure water for 100 milliseconds was measured at 23° C. under a relative humidity of 50%. The thus measured amount of pure water transferred to the printing medium was determined as a water absorption of the printing medium as measured in a pure water contact time of 100 milliseconds. The measuring conditions are shown below.

| "Spiral Method" | |
|---|---|
| Contact time: 0.010 to 1.0 (sec) | |
| Pitch (mm): 7 | |
| Length Per Sampling (degree): 86.29 | |
| Start Radius (mm): 20 | End Radius (mm): 60 |
| Min Contact Time (ms): 10 | Max Contact Time (ms): 1000 |
| Sampling Pattern (1-50): 50 | |
| Number of Sampling Points (>0): 19 | |
| "Square Head" | |
| Split Span (mm): 1 | Split Width (mm): 5 |

Production Example 1 (Synthesis of Water-Insoluble Polymer)

Sixteen (16) parts of methacrylic acid available from Wako Pure Chemical Industries, Ltd., 44 parts of styrene available from Wako Pure Chemical Industries, Ltd., 30 parts of a styrene macromonomer "AS-6S" (number-average molecular weight: 6,000; solid content: 50%) available from Toagosei Co., Ltd., and 25 parts of methoxypolyethylene glycol methacrylate "BLEMMER PME-200" available from NOF Corporation were mixed with each other to prepare 115 parts of a monomer mixture solution.

Eighteen (18) parts of methyl ethyl ketone and 0.03 part of 2-mercaptoethanol as a chain transfer agent as well as 10% (11.5 parts) of the monomer mixture solution prepared above were charged into a reaction vessel and mixed with each other, and then an inside atmosphere of the reaction vessel was fully replaced with nitrogen gas.

Separately, a mixed solution prepared by mixing remaining 90% (103.5 parts) of the monomer mixture solution, 0.27 part of the aforementioned chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the mixed solution, and the resulting reaction solution was further aged at 75° C. for 2 hours and then at 80° C. for 2 hours, followed by further adding 50 parts of methyl ethyl ketone thereto, thereby obtaining a solution of a water-insoluble polymer (having a weight-average molecular weight of 50,000). The solid content of the thus obtained water-insoluble polymer solution was 45% by mass.

Production Example 2 (Production of Water Dispersion of Black Pigment-Containing Polymer Particles)

Added into a solution prepared by dissolving 95.2 parts of the water-insoluble polymer solution obtained in Production Example 1 in 53.9 parts of methyl ethyl ketone were 15.0 parts of a 5N sodium hydroxide aqueous solution and 0.5 part of a 25% ammonia aqueous solution both acting as a neutralizing agent as well as 341.3 parts of ion-exchanged water. Furthermore, 100 parts of C.I. Pigment Black 7 (P.B. 7) as a carbon black pigment available from Cabot Corporation was added to the resulting mixture to prepare a pigment mixed solution. The degree of neutralization of the polymer in the thus prepared pigment mixed solution was 78.8 mol %. The pigment mixed solution was mixed at 20° C. for 1 hour using a disper blade operated at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The thus obtained dispersion of the pigment-containing polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was subjected to filtration treatment through a filter "Minisart Syringe Filter" (pore size: 5 µm; material: cellulose acetate) available from Sartorius Inc., to remove coarse particles therefrom, thereby obtaining a water dispersion of the pigment-containing polymer particles. The solid content of the thus obtained water dispersion was 25% by mass. Then, 0.45 part of "DENACOL EX 321L" available from Nagase ChemteX Corporation and 15.23 parts of ion-exchanged water were added to 100 parts of the resulting water dispersion of the pigment-containing polymer particles, and the resulting mixture was subjected to heat treatment at 70° C. for 3 hours while stirring. After cooling the obtained dispersion to room temperature, a liquid layer portion separated therefrom was subjected to filtration treatment through a filter "Minisart Syringe Filter" (pore size: 5 µm; material: cellulose acetate) available from Sartorius Inc., to remove coarse particles therefrom, thereby obtaining a water dispersion of the pigment-containing polymer particles (solid content: 22.00% by mass). The average particle size of the pigment-containing polymer particles in the resulting water dispersion was 100 nm.

Production Examples 3 to 5 (Production of Water Dispersions of Cyan Pigment-, Magenta Pigment- and Yellow Pigment-Containing Polymer Particles)

The same procedure as in Production Example 2 was repeated except that the black pigment was replaced with a cyan pigment "PB. 15:3" available from DIC Corporation, a magenta pigment "P.R. 150" available from Fuji Pigment Co., Ltd., and a yellow pigment "P.Y. 74" available from Dainichiseika Color & Chemicals Mfg. Co., Ltd., respectively, and the production conditions used therein were changed as shown in Table 1, thereby obtaining water dispersions of the pigment-containing polymer particles (solid content: 22.00% by mass). The results are shown in Table 1.

41.6% by weight. The average particle size of the polymer particles in the resulting fixing aid polymer emulsion was 100 nm.

Production Example 7 (Production of Black Ink)

A mixed solution was prepared by mixing 4626.75 g of the water dispersion of the black pigment-containing polymer particles (solid content: 22.0% by mass) obtained in Production Example 2, 438.87 g of the fixing aid polymer emulsion (solid content: 41.6% by weight) obtained in Production Example 6, 100.00 g of diethylene glycol monoisobutyl ether, 2300.00 g of propylene glycol, 20.00 g of a silicone-based surfactant "KF-6011" available from Shin-Etsu Chemical Co., Ltd., 100.00 g of an acetylene-based surfactant "SURFYNOL 440" available from Nissin Chemical Co., Ltd., and 2414.38 g of ion-exchanged water with each other. The resulting mixed solution was subjected to filtration treatment by passing through a filter "Minisart Syringe Filter" (pore size: 5.0 μm; material: cellulose

TABLE 1

| | | Production Example 2 | Production Example 3 | Production Example 4 | Production Example 5 |
|---|---|---|---|---|---|
| Water dispersion | Kind of pigment | Black P.B. 7 | Cyan P.B. 15:3 | Magenta P.R. 150 | Yellow P.Y. 74 |
| | Solid content (%) | 22.00 | 22.00 | 22.00 | 22.00 |
| | Ratio of pigment introduced (%) | 68.76 | 68.52 | 68.52 | 68.52 |
| Composition (part(s) by mass) | Pigment (A) | 15.13 | 15.08 | 15.08 | 15.08 |
| | Pigment dispersing polymer (B-1)*[1] | 6.48 | 6.46 | 6.46 | 6.46 |
| | "DENACOL EX 321L" | 0.39 | 0.46 | 0.46 | 0.46 |
| | Ion-exchanged water | 78.00 | 78.00 | 78.00 | 78.00 |
| | Total | 100.00 | 100.00 | 100.00 | 100.00 |
| Properties | Viscosity (mPa · s) | 4.2 | 3.9 | 4.2 | 4 |
| | pH | 9.9 | 9.8 | 9.9 | 9.9 |
| | Average particle size (nm) | 100 | 100 | 155 | 115 |

Note
*[1]Water-insoluble polymer obtained in Production Example 1

Production Example 6 (Production of Fixing Aid Polymer Emulsion)

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (emulsifier; active ingredient content: 26%) available from Kao Corporation, 96 parts of ion-exchanged water and potassium persulfate available from Wako Pure Chemical Industries, Ltd., and the contents of the flask were stirred using an agitation blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with nitrogen gas. In a nitrogen atmosphere, the contents of the reaction vessel were heated to 80° C. while stirring with an agitation blade (200 rpm), and then the aforementioned monomer emulsion was charged into a dropping funnel and added dropwise into the reaction vessel over 3 hours to subject the monomer emulsion to polymerization reaction. The obtained reaction solution was mixed with ion-exchanged water, thereby obtaining a fixing aid polymer emulsion having a solid content of acetate) available from Sartorius Inc., thereby obtaining a water-based ink. Various properties of the resulting water-based ink are shown in Table 2.

Production Examples 8 to 10 (Production of Cyan, Magenta and Yellow Inks)

The same procedure as in Production Example 7 was repeated except that the water dispersion of the black pigment-containing polymer particles was replaced with the respective water dispersions containing the cyan pigment-, magenta pigment- and yellow pigment-containing polymer particles, and the production conditions used therein were changed as shown in Table 2, thereby obtaining cyan, magenta and yellow water-based inks. The results are shown in Table 2. In addition, the four color inks obtained in Production Examples 7 to 10 were used as an ink set 1. Various properties of the ink set 1 are shown in Table 2.

Production Examples 11 to 14, 15 to 18 and 19 to 22

The same procedures as in Production Examples 7 to 10 were repeated except that the four color inks obtained in Production Examples 11 to 14, the four color inks obtained in Production Examples 15 to 18 and the four color inks obtained in Production Examples 19 to 22, which were produced under the conditions shown in Table 3, were used as an ink set 2, an ink set 3 and an ink set 4, respectively. The results are shown in Table 2.

tion apparatus in the order of the black ink, cyan ink, magenta ink and yellow ink from an upstream side in the feed direction of the printing medium. At this time, the

TABLE 2

| | | Ink set 1 | | | | Ink set 2 | | | |
|---|---|---|---|---|---|---|---|---|---|
| | | Production Example No. | | | | | | | |
| | | 7 | 8 | 9 | 10 | 11 | 12 | 13 | 14 |
| | Kind of ink | Black | Cyan | Magenta | Yellow | Black | Cyan | Magenta | Yellow |
| Ink composition (part(s) by mass) | Black pigment-containing water dispersion | 10.18 | — | — | — | 10.18 | — | — | — |
| | Cyan pigment-containing water dispersion | — | 10.22 | — | — | — | 10.22 | — | — |
| | Magenta pigment-containing water dispersion | — | — | 10.22 | — | — | — | 10.22 | — |
| | Yellow pigment-containing water dispersion | — | — | — | 10.22 | — | — | — | 10.22 |
| | Fixing aid polymer emulsion | 1.82 | 1.78 | 1.78 | 1.78 | 1.82 | 1.78 | 1.78 | 1.78 |
| | Propylene glycol | 23.00 | 22.00 | 21.00 | 20.00 | 23.00 | 23.00 | 23.00 | 23.00 |
| | Diethylene glycol monoisobutyl ether | 1.00 | 2.00 | 3.00 | 4.00 | 1.00 | 1.00 | 1.00 | 1.00 |
| | Silicone-based surfactant | 0.20 | 0.30 | 0.40 | 0.50 | 0.20 | 0.20 | 0.20 | 0.20 |
| | Acetylene-based surfactant | 1.00 | 1.00 | 1.00 | 1.00 | 0.80 | 1.00 | 1.20 | 1.40 |
| | Ion-exchanged water | 62.80 | 62.70 | 62.60 | 62.50 | 63.00 | 62.80 | 62.60 | 62.40 |
| Properties | Average particle size (nm) | 96.2 | 101.3 | 155.6 | 116.7 | 95.9 | 100.6 | 156.5 | 113.2 |
| | Viscosity at 32° C. (mPa · s) | 4.8 | 4.4 | 4.9 | 5.1 | 4.6 | 4.2 | 4.6 | 4.7 |
| | Static surface tension (mN/m) | 28.0 | 27.5 | 26.7 | 25.9 | 28.9 | 28.1 | 27.6 | 27.2 |
| | pH | 9.6 | 9.4 | 9.6 | 9.3 | 9.6 | 9.4 | 9.7 | 9.4 |
| | | Ink set 3 | | | | Ink set 4 | | | |
| | | Production Example No. | | | | | | | |
| | | 15 | 16 | 17 | 18 | 19 | 20 | 21 | 22 |
| | Kind of ink | Black | Cyan | Magenta | Yellow | Black | Cyan | Magenta | Yellow |
| Ink composition (part(s) by mass) | Black pigment-containing water dispersion | 10.18 | — | — | — | 10.18 | — | — | — |
| | Cyan pigment-containing water dispersion | — | 10.22 | — | — | — | 10.22 | — | — |
| | Magenta pigment-containing water dispersion | — | — | 10.22 | — | — | — | 10.22 | — |
| | Yellow pigment-containing water dispersion | — | — | — | 10.22 | — | — | — | 10.22 |
| | Fixing aid polymer emulsion | 1.82 | 1.78 | 1.78 | 1.78 | 1.82 | 1.78 | 1.78 | 1.78 |
| | Propylene glycol | 23.00 | 23.00 | 23.00 | 23.00 | 23.00 | 23.00 | 23.00 | 23.00 |
| | Diethylene glycol monoisobutyl ether | 1.00 | 1.00 | 1.00 | 1.00 | 1.00 | 1.00 | 1.00 | 1.00 |
| | Silicone-based surfactant | 0.20 | 0.20 | 0.20 | 0.20 | 0.00 | 0.00 | 0.00 | 0.00 |
| | Acetylene-based surfactant | 1.00 | 1.00 | 1.00 | 1.00 | 0.80 | 1.00 | 1.20 | 1.40 |
| | Ion-exchanged water | 62.80 | 62.80 | 62.80 | 62.80 | 63.20 | 63.00 | 62.80 | 62.60 |
| Properties | Average particle size (nm) | 96.6 | 98.6 | 150.5 | 117.4 | 93.2 | 101.6 | 148.8 | 112.5 |
| | Viscosity at 32° C. (mPa · s) | 4.7 | 4.1 | 4.5 | 4.5 | 4.5 | 4.2 | 4.6 | 4.7 |
| | Static surface tension (mN/m) | 28.0 | 28.0 | 27.9 | 28.0 | 30.9 | 30.2 | 29.3 | 28.6 |
| | pH | 9.6 | 9.4 | 9.7 | 9.4 | 9.5 | 9.3 | 9.5 | 9.2 |

Examples 1 and 2 and Comparative Example 1

Using the ink set 1 obtained in Production Examples, characters or images were printed on a corona-treated PET "TAIKO Polyester Film FE2001" (water absorption of the printing medium as measured by contacting the printing medium with pure water for 100 milliseconds: 0 g/m$^2$) available from Futamura Chemical Co., Ltd., by the following ink-jet printing method.

(Ink-Jet Printing Method)

Under the environmental conditions of a temperature of 25±1° C. and a relative humidity of 30±5%, the water-based inks were loaded into a one-pass system print evaluation apparatus available from Trytech Co., Ltd., equipped with ink-jet print heads "KJ4B-HDO6MHG-STDV" (piezoelectric type) available from Kyocera Corporation. These ink-jet print heads were sequentially disposed in the print evaluation apparatus in the order of the black ink, cyan ink, magenta ink and yellow ink from an upstream side in the feed direction of the printing medium. At this time, the ink-jet print heads respectively loaded with the black ink, cyan ink, magenta ink and yellow ink were arranged in the print evaluation apparatus such that adjacent two of the ink-jet print heads were spaced at a distance of 55 cm apart from each other.

The operating conditions of the print evaluation apparatus were set to a head applied voltage of 26 V, a frequency of 10 kHz, an ejected ink droplet amount of 3 pL, a head temperature of 32° C., a resolution of 600 dpi, a number of ink shots for flashing before being ejected of 200 shots and a negative pressure of −4.0 kPa, and the printing medium was fixed in the print evaluation apparatus such that the longitudinal direction of the printing medium was aligned with a transportation direction thereof.

The print evaluation apparatus was equipped with the ink-jet print heads for ejecting the water-based inks onto the printing medium and an under heater for heating the printing medium from a rear side surface of the printing medium opposed to a front side surface thereof which faces to the respective ink-jet print heads. The distance between the under heater and the printing medium was set to 0.25 mm, and the distance between the respective ink-jet print heads and the printing medium was set to 1.0 mm. In addition, the surface temperature of the under heater was set to 20° C., 40° C. or 60° C.

An A4-size film heater available from Kawai Corporation was fixedly mounted to a transportation table for the printing medium so as to heat the printing medium. The temperature of the film heater was set to 20° C., 40° C. or 60° C., and the transportation speed of the printing medium was adjusted to 25 m/min.

Then, a printing command was transmitted to the print evaluation apparatus to eject the black ink, cyan ink, magenta ink and yellow ink therefrom in this order. As a result, solid images of the respective color inks were printed on the printing medium such that the solid images of the different two color inks among the four color inks were formed in a perpendicularly overlapped relation to each other to thereby prepare three print patterns as shown in FIG. 1. Thereafter, the thus prepared print patterns were dried by a hot air dryer at 60° C. for 5 minutes, thereby obtaining a printed material.

The resulting printed material was subjected to evaluation of color bleeding, evaluation of deformation of the substrate by heating and evaluation of uniformity of solid images according to the following methods and evaluation ratings. The results are shown in Table 3.

(Method of Evaluating Color Bleeding of Printed Material)

In a portion of the printed material where the two solid images of the different color inks were perpendicularly overlapped each other to thereby cause color bleeding, the width of a protruded portion of one of the color inks from the perpendicularly overlapped portion of the two solid images in which the solid image of one of the color inks was intruded into the solid image of the other of the color inks was measured. The width of the protruded portion was measured with respect to each combination of the different two color inks among the four color inks to calculate an average value thereof. The degrees of color bleeding caused in the printed material were compared based on the thus obtained average value, and evaluated according to the following evaluation ratings.

A: The average value of the widths of the protruded portions was less than 80 µm, and substantially no color bleeding was recognized.

B: The average value of the widths of the protruded portions was not less than 80 µm and less than 100 µm, and no remarkable color bleeding was recognized, so that the resulting printed material was usable in practical applications without problems.

C: The average value of the widths of the protruded portions was not less than 100 µm and less than 200 µm, and although slight color bleeding was recognized, the resulting printed material was still usable in practical applications without problems.

D: The average value of the widths of the protruded portions was not less than 200 µm, and color bleeding clearly occurred so that the resulting printed material was unusable in practical applications.

(Evaluation Ratings for Deformation of Printed Material by Heating)

A: No deformation of the printed material was observed.

B: Deformation of the printed material was observed.

(Evaluation Ratings for Uniformity of Solid Image Printed)

A: No mottling nor uneven density was observed in a solid image printed portion.

B: Mottling or uneven density was observed in less than 10% of an area of the solid image printed portion, but the resulting printed material was still usable in practical applications without problems.

C: Mottling or uneven density was observed in not less than 10% of an area of the solid image printed portion, and significant problems were caused upon using the printed material in practical applications.

Examples 3 and 4 and Comparative Example 2

The same procedure in Example 2 was repeated except that the ink set was replaced with the respective ink sets shown in Table 3.

Example 5 and Comparative Example 3

The same procedure in Example 2 was repeated except that the corona-treated PET as the printing medium was replaced with a corona discharge-treated OPP "TAIKO Polypropylene Film FOR-AQ" available from Futamura Chemical Co, Ltd., and further in Comparative Example 3, the temperature of the under heater was changed to 80° C.

TABLE 3

|  |  | Ex. 1 | Ex. 2 | Com. Ex. 1 | Ex. 3 | Com. Ex. 2 | Ex. 4 | Ex. 5 | Com. Ex. 3 |
|---|---|---|---|---|---|---|---|---|---|
|  | No. of ink set used | 1 | 1 | 1 | 2 | 3 | 4 | 1 | 1 |
|  | Temperature of under heater (° C.) | 40 | 60 | 20 | 60 | 60 | 60 | 60 | 80 |
|  | Printing medium used | PET | PET | PET | PET | PET | PET | OPP | OPP |
| Evaluation results | Color bleeding | B | A | D | B | D | C | A | B |
|  | Deformation of printed material | A | A | A | A | A | A | A | B |
|  | Uniformity of solid image printed | A | A | A | A | A | B | A | A |

As is apparent from the comparison of Examples 1 and 2 with Comparative Example 1, the comparison of Examples 3 and 4 with Comparative Example 2 and the comparison of Example 5 with Comparative Example 3 as shown in Table 3, it was confirmed that the ink-jet printing methods of the Examples hardly suffered from color bleeding or deformation of the printed materials and were capable of obtaining good printed characters or images which were excellent in uniformity, as compared to the ink-jet printing methods of the Comparative Examples.

INDUSTRIAL APPLICABILITY

According to the ink-jet printing method of the present invention, it is possible to obtain good printed characters or images which are free of not only thermal deformation of a low-liquid printing medium, but also mottling or color bleeding.

The invention claimed is:

1. An ink-jet printing method comprising:
providing an ink-jet printing apparatus equipped with an ink-jet print head that is capable of ejecting water-based inks onto a low-liquid absorbing printing medium;
providing water-based inks each comprising a colorant (A), an organic solvent (C), and water, wherein a static surface tension of the respective water-based inks as measured at 20° C. is in the range 22 mN/m through 45 mN/m and wherein a difference in static surface tension between each of said three or more kinds of water-based inks is not less than 0.1 mN/m;
providing a low-liquid absorbing printing medium;
loading the ink-jet printing apparatus with three or more kinds of said water-based inks which are different in static surface tension from each other;
heating the printing medium to a temperature of from 30 to 75° C.; and
ejecting the water-based inks in the sequential order from the water-based ink having a higher static surface tension, thereby printing characters or images on the low-liquid absorbing printing medium.

2. The ink-jet printing method according to claim 1, wherein the colorant (A) in the respective water-based inks is present in the form of pigment-containing water-insoluble polymer particles.

3. The ink-jet printing method according to claim 1, wherein the organic solvent (C) comprises a glycol ether (c-2).

4. The ink-jet printing method according to claim 1, wherein a boiling point of the organic solvent (C) is not lower than 90° C. and lower than 250° C.

5. The ink-jet printing method according to claim 1, wherein a content of the organic solvent (C) in the respective water-based inks is not less than 15% by mass and not more than 45% by mass.

6. The ink-jet printing method according to claim 1, wherein the water-based inks each further comprise a polymer (B).

7. The ink-jet printing method according to claim 1, wherein the water-based inks each further comprise a surfactant (D).

8. The ink-jet printing method according to claim 7, wherein the surfactant (D) comprises a silicone-based surfactant (d-1).

9. The ink-jet printing method according to claim 1, wherein a static surface tension of the respective water-based inks as measured at 20° C. is not less than 25 mN/m and not more than 35 mN/m.

10. The ink-jet printing method according to claim 1, wherein a difference in static surface tension between the three or more kinds of water-based inks is not less than 03 mN/m.

11. The ink-jet printing method according to claim 1, wherein a viscosity of the respective water-based inks as measured at 32° C. is not less than 2.0 mPa·s and not more than 12 mPa·s.

12. The ink-jet printing method according to claim 1, wherein the low-liquid absorbing printing medium is a polyester film subjected to corona discharge treatment or an oriented polypropylene film subjected to corona discharge treatment.

13. The ink-jet printing method according to claim 1, wherein the printing medium is heated by the ink-jet print head that is capable of ejecting the water-based inks onto the printing medium and an under heater that is disposed on a rear side surface of the printing medium opposed to a front side surface thereof which faces to the ink-jet print head.

14. The ink-jet printing method according to claim 1, wherein a printing speed of printing the characters or images on the printing medium is not less than 5 m/min and not more than 75 m/min in terms of a transportation speed of the printing medium.

15. The ink-jet printing method according to claim 1, wherein the characters or images are printed on the printing medium by a single-pass (one-pass) method.

16. The ink-jet printing method according to claim 1, wherein the respective colorant-containing inks are ejected onto the printing medium that is not subjected to any pretreatments.

17. The ink-jet printing method according to claim 1, wherein a content of the pigment (A) in the respective water-based inks is not less than 2.0% by mass and not more than 30.0% by mass.

18. The ink-jet printing method according to claim 1, wherein a content of the polymer (B) in the respective water-based inks is not less than 1.0% by mass and not more than 20% by mass.

19. The ink-jet printing method according to claim 1, wherein a content of the surfactant (D) in the respective water-based inks is not less than 0.1% by mass and not more than 5% by mass.

20. The ink-jet printing method according to claim 1, wherein a content of water in the respective water-based inks is not less than 20% by mass and not more than 85% by mass.

21. The ink-jet printing method according to claim 1, wherein said low-liquid absorbing printing medium is a non-liquid absorbing medium.

* * * * *